US 8,701,695 B2

(12) United States Patent
Beetham

(10) Patent No.: US 8,701,695 B2
(45) Date of Patent: Apr. 22, 2014

(54) WASTEWATER VALVE ARRANGEMENT

(75) Inventor: Peter Beetham, Cornubia (AU)

(73) Assignee: Odour Technologies Pty Ltd, Cornubia (AU)

( * ) Notice: Subject to any disclaimer, the term of this patent is extended or adjusted under 35 U.S.C. 154(b) by 451 days.

(21) Appl. No.: 12/996,534

(22) PCT Filed: Jun. 4, 2009

(86) PCT No.: PCT/AU2009/000707
§ 371 (c)(1),
(2), (4) Date: Feb. 23, 2011

(87) PCT Pub. No.: WO2009/146499
PCT Pub. Date: Dec. 10, 2009

(65) Prior Publication Data
US 2011/0146817 A1    Jun. 23, 2011

(30) Foreign Application Priority Data
Jun. 6, 2008  (AU) .............................. 2008902888

(51) Int. Cl.
*F16K 24/04*    (2006.01)
(52) U.S. Cl.
USPC .......................................... 137/202; 137/544
(58) Field of Classification Search
USPC .......... 137/549, 544, 265, 202; 210/109, 117, 210/119, 418
See application file for complete search history.

(56) References Cited

U.S. PATENT DOCUMENTS

| | | | |
|---|---|---|---|
| 546,606 A * | 9/1895 | Brainerd ....................... | 137/544 |
| 551,333 A * | 12/1895 | Lawler ......................... | 137/544 |
| 741,330 A * | 10/1903 | Hartmann ................ | 137/247.23 |
| 777,420 A * | 12/1904 | Hunt ............................. | 210/119 |
| 1,179,814 A * | 4/1916 | Englehart ..................... | 137/544 |
| 1,469,963 A * | 10/1923 | Sartakoff ...................... | 137/544 |
| 1,696,366 A * | 12/1928 | Smith ........................... | 137/549 |
| 1,936,537 A | 11/1933 | Borden | |
| 2,204,788 A | 6/1940 | Borden | |
| 2,252,687 A * | 8/1941 | Bassett ......................... | 137/202 |
| 2,278,002 A * | 3/1942 | Thompson .................... | 137/544 |
| 2,603,493 A | 7/1952 | Rusconi | |
| 3,478,882 A * | 11/1969 | Hornemann .................. | 210/119 |
| 4,082,106 A * | 4/1978 | Butcher ........................ | 137/202 |
| 5,090,438 A * | 2/1992 | Nimberger .................... | 137/549 |
| 5,433,239 A * | 7/1995 | Taylor ........................... | 137/549 |
| 6,899,119 B2 * | 5/2005 | Ehrman et al. ................ | 137/202 |
| 2006/0042690 A1 * | 3/2006 | Aoki et al. .................... | 137/202 |

FOREIGN PATENT DOCUMENTS

| | | |
|---|---|---|
| GB | 1208719 A | 10/1970 |
| GB | 1440529 A | 6/1976 |
| JP | 2004-204981 A | 7/2004 |
| WO | 98/11370 A1 | 3/1998 |

OTHER PUBLICATIONS

English Translation of JP 2004-204981 A Published Jul. 22, 2004.

* cited by examiner

*Primary Examiner* — Craig Schneider
*Assistant Examiner* — Craig J Price
(74) *Attorney, Agent, or Firm* — Ladas & Parry LLP

(57) ABSTRACT

The present invention relates to a wastewater valve arrangement. The valve arrangement includes a first receptacle for receiving a filter to filter wastewater. A second receptacle receives the filtered wastewater. A valve is provided for impeding the egress of filtered wastewater from the second receptacle. In one embodiment, the valve is configured to be normally open, and is configured to permit the release and ingress of air relative to the second receptacle. The valve may include a float that defines a recess.

7 Claims, 2 Drawing Sheets

WASTEWATER VALVE ARRANGEMENT

TECHNICAL FIELD

The present invention relates to a wastewater valve arrangement.

BACKGROUND

The reference to any prior art in this specification is not, and should not be taken as an acknowledgement or any form of suggestion that the prior art forms part of the common general knowledge.

Wastewater systems, including sewage systems, are inherently affected by the presence of unwanted pressurized air in pipelines that can result in operational problems such as broken pumps, valves and pipes. In order to minimise these problems, air release valves (ARVs) are located at the high-points of pressurised pipelines to de-aerate the pipelines and relieve any excess pressure.

An ARV typically includes a receptacle engaged with the pipeline to receive pressurized air and wastewater. A float valve is fitted to the receptacle and releases air in the receptacle as pipeline pressure increases. The float valve also permits the ingress of air into the receptacle as pipeline pressure decreases. The float valve further includes a float which rises with the wastewater level in the receptacle, to close the valve and thereby prevent wastewater from exiting the ARV.

In practice, wastewater flotsam builds up within the receptacle over time and can have a detrimental effect on the operation of the ARV. Accordingly, it is often necessary to periodically clean the interior of the receptacle from flotsam which can be an arduous task. Furthermore, wastewater flotsam can clog up the float valve and thereby render the ARV ineffectual.

Furthermore, the float is often in the form of a sealed ball which can implode or burst in the event of excess pressure in the receptacle, thereby also hindering the performance of the ARV.

Embodiments of the present invention provide a wastewater valve arrangement for impeding clogging of the valve with flotsam.

Embodiments of the present invention provide a wastewater valve arrangement having an implosion resistant float.

SUMMARY OF THE INVENTION

According to one aspect of the present invention, there is provided a wastewater valve arrangement including:
a first receptacle for receiving a filter to filter wastewater;
a second receptacle for receiving the filtered wastewater; and
valve means for impeding the egress of filtered wastewater from the second receptacle.

Preferably, the valve means is configured to permit the release and ingress of air relative to the second receptacle. Typically, the valve means is configured to be normally open. The valve means may include a float that defines a recess.

The valve arrangement may further include the filter which, in turn, includes an endless mesh wall. The filter may further include an inlet tube which extends from the mesh wall. The inlet tube may have a lesser cross sectional area than a portion of the mesh wall. The filter may further include a handle mounted to the mesh wall.

Preferably, the first receptacle includes a container to which a lid can be fitted in air tight engagement. The lid may be fitted to the first receptacle in air tight engagement using an O-ring.

The upper end of the first receptacle may form a compression chamber in which air can be compressed.

Preferably, the second receptacle includes a container to which a lid can be fitted in air tight engagement. The lid may define an aperture through which the valve means extends when fitted.

The receptacles may be interconnected by a pair of connection tubes. The tubes may be spaced apart and parallel. Alternatively, the tubes may divergently extend from the first receptacle.

According to another aspect of the present invention, there is provided a wastewater valve arrangement including:
a filter for filtering wastewater;
a receptacle for receiving the filtered wastewater; and
valve means for impeding the egress of filtered wastewater from the receptacle.

According to another aspect of the present invention, there is provided a wastewater valve arrangement including:
a first receptacle for receiving wastewater, and defining a compression chamber at an upper end in which air can be compressed;
a second receptacle for receiving the wastewater from the first receptacle; and
valve means for impeding the egress of wastewater from the second receptacle.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to the drawing as follows.

DETAILED DESCRIPTION OF PREFERRED EMBODIMENTS

Figure 1:
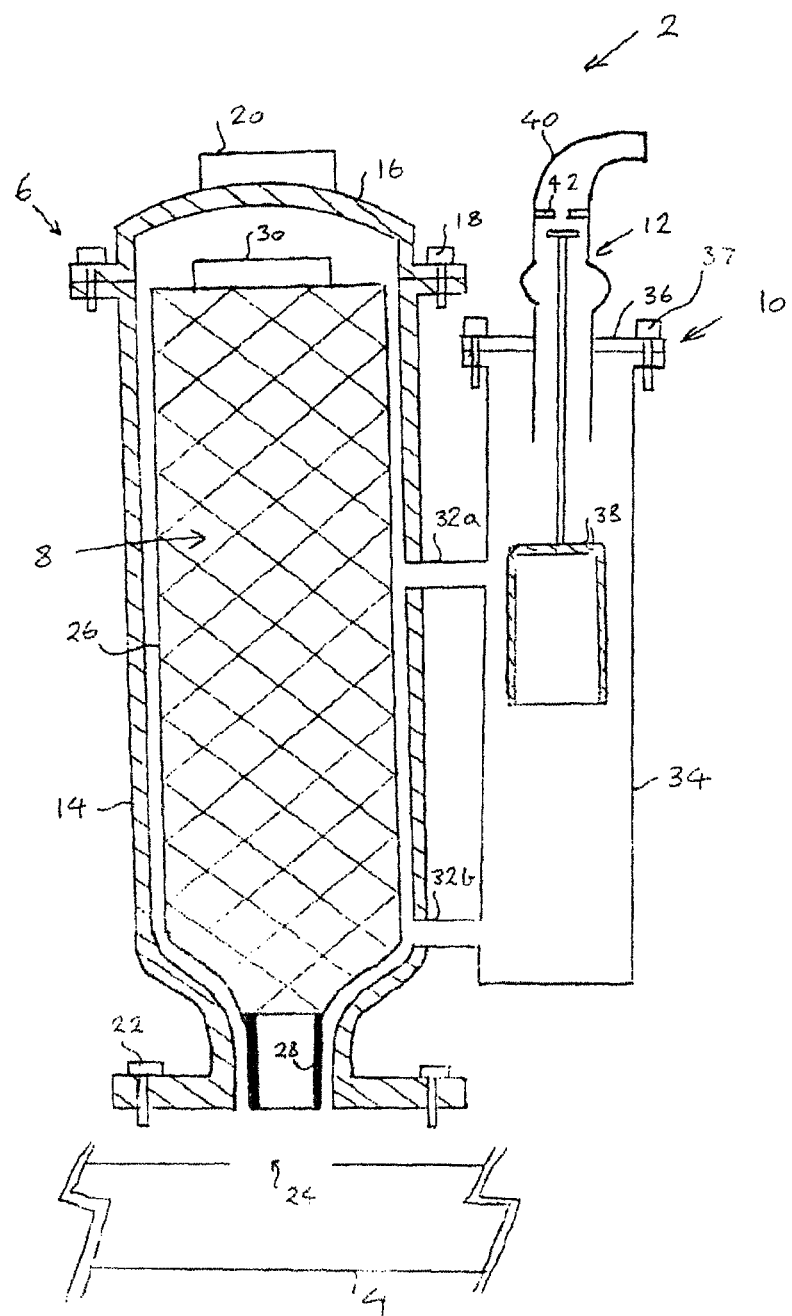
FIG. 1 is a side sectional view of a wastewater air release valve (ARV) in accordance with an embodiment of the present invention.

According to an embodiment of the present invention, there is provided a wastewater air release valve ARV 2 shown in FIG. 1 which is suitable for fitting to the pipeline 4 of a sewage system. The ARV 2 includes a filtration receptacle 6 for receiving a removable filter 8 to filter wastewater. A valve receptacle 10 is provided for receiving the filtered wastewater from the filtration receptacle 6. The ARV 2 further includes a float valve 12 which is fitted to the valve receptacle 10. The float valve 12 permits the release and ingress of air relative to the valve receptacle 10, and impedes the egress of filtered wastewater from the valve receptacle 10. A detailed description of the ARV 2 is provided in detail below.

The filtration receptacle 6 includes a container 14 to which a lid 16 can be fitted in air tight engagement using an O-ring (not shown). The lid 16 is releasably fastened to the container 14 using fasteners 18 that take the form of nut and bolt arrangements. A handle 20 is mounted to the lid 16 to facilitate hand separation of the lid 16 from the container 14. The base of the container 14 defines a throat from which a flange extends. The flange can be mounted to the pipeline 4 using fasteners 22 so that the throat of the container 14 is in register with an aperture 24 defined in the pipeline 4.

The ARV 2 further includes the filter 8 which, in turn, includes an endless mesh wall 26. The filter 8 further includes a solid inlet tube 28 which extends from the base of the mesh wall 26. The base of the mesh wall 26 also defines a throat so that the inlet tube 28 has a lesser cross sectional area than the upper end of the mesh wall 26. The filter 8 further includes a handle 30 mounted to the top of the mesh wall 26 to facilitate hand removal of the filter 8 from the container 14.

A pair of open connection tubes 32a,b interconnect the receptacles 6,10 so that fluid can freely pass between them. These two spaced tubes 32 provide for a structurally stable ARV 2.

The valve receptacle 10 includes a container 34 to which a lid 36 can be fitted in air tight engagement using an O-ring (not shown). The lid 36 is releasably fastened to the container 34 using fasteners 37 that take the form of complementary nut and bolt arrangements. The lid 36 defines a central aperture through which the float valve 12 extends when fitted.

The float valve 12 includes a float 38 at its base that defines an underside recess. In use, wastewater filling the container 34 lifts the float 38 and thereby traps air in the underside recess. The float is not prone to implosion as there is no significant pressure differential between the air in the underside recess and the air in the container 34.

The float valve 12 further includes a bent housing 40 in which an annular seat 42 is fitted. An arm, extending from the float 38, terminates in an upper stopper that engages with the seat to close the valve 12. The float valve 12 is configured to be normally open and closes as the wastewater level rises in the valve receptacle 10.

In use when the pipeline pressure increases, wastewater (i.e. sewage) including flotsam and other debris exits the pipeline 4 and enters the filtration receptacle 6. In turn air in the filtration receptacle 6 passes through the connection tubes 32a,b, the valve receptacle 10 and out through the float valve 12. As the wastewater level in the filtration receptacle 6 increases, wastewater passes into the valve receptacle 10 via the filter 8 and connection tubes 32a,b respectively. Accordingly, flotsam is impeded from entering the valve receptacle 10 and remains within the filter 8.

Compressed air is trapped at the top the filtration receptacle 6 as the wastewater level rises therein above the connection tube 32a. This compressed air cannot escape as the lid 16 is fitted in air tight engagement with the container 14, and facilitates flushing of flotsam back into the pipeline 4 when the wastewater level (and pipeline pressure) drops. The wastewater fills the ARV 2 at a controlled rate and thereby prevents a shock or water hammer condition from occurring that might otherwise damage the ARV 2 or pipeline 4.

As the filtered wastewater level increases above a predetermined threshold within the valve receptacle 10, the valve 12 closes as previously described to thereby impede the egress of wastewater from the valve 12. As the pipeline pressure drops with decreasing wastewater level, the valve 12 opens once more to permit the ingress of fresh air into the ARV 2.

Periodically, the user can clean the ARV 2 of collected wastewater flotsam. The lid 16 is unfastened from the container 14 and removed using the lid handle 20. In turn, the user can readily remove the filter 8 from within the container 14 using the filter handle 30. In practice, the filter 8 holds accumulated flotsam which is prevented from reaching and otherwise clogging the valve 12. Much of the heavier filtered flotsam rests in or upon the base tube 28 and can be extricated using a pipe cleaner. The mesh wall 26 of the filter 8 can be subsequently cleaned using a high pressure hose, and the filter 8 can then be returned to the cleaned container 14. The high pressure hose can also be used to clean the interior of the container 34 and float valve 12 upon removal of the lid 36.

A person skilled in the art will appreciate that many embodiments and variations can be made without departing from the ambit of the present invention.

For example, in one embodiment, compressible hollow rubber balls may be provided within the underside recess of the float 38.

In another embodiment, the throat at the base of the container 14 may be fitted with a drain tap through which any excess wastewater in the container 14 can be drained during cleaning.

Figure 2:
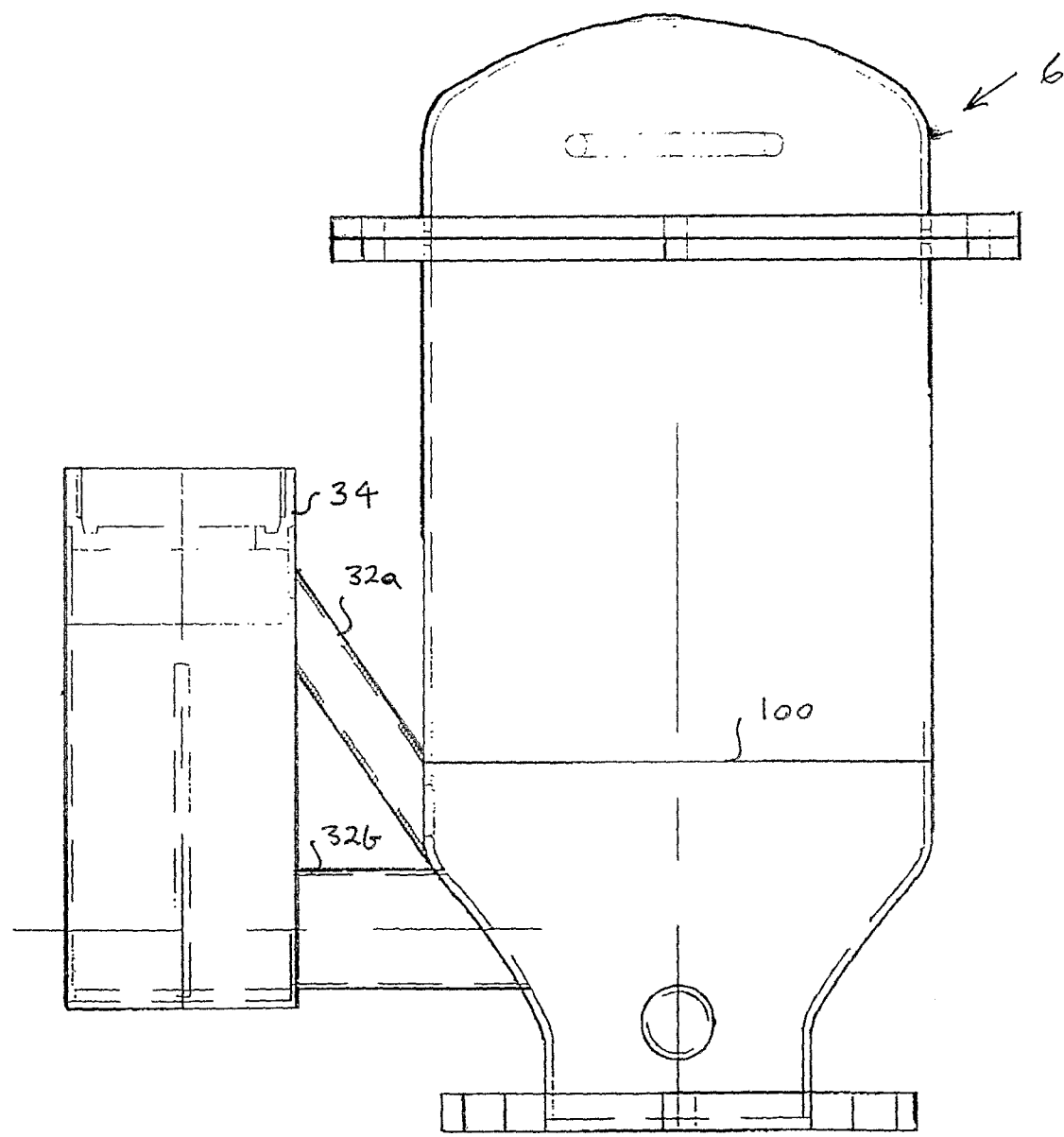
FIG. 2 is a side view of a wastewater air release valve (ARV) in accordance with another embodiment of the present invention.

In another embodiment shown in FIG. 2, the connection tubes 32a, 32b divergently extend from the filtration receptacle 6. Once again, compressed air is trapped at the top the filtration receptacle 6 as the wastewater level 100 rises therein above the mouth of connection tube 32a. Compression of the air within receptacle 6 in the embodiment of FIG. 2 occurs sooner than the embodiment of FIG. 1.

In compliance with the statute, the invention has been described in language more or less specific to structural or methodical features. It is to be understood that the invention is not limited to specific features shown or described since the means herein described comprises preferred forms of putting the invention into effect.

The claims defining the invention are as follows:

1. A wastewater valve arrangement comprising:
   a first receptacle for receiving wastewater, the first receptacle including an openable lid, the first receptacle defining a compression chamber at an upper end in which air can be compressed, the first receptacle having a central longitudinal axis and an inlet configured to receive wastewater from external to the first receptacle, the inlet having a central longitudinal axis parallel to the central longitudinal axis of the first receptacle;
   a second receptacle for receiving the wastewater from the first receptacle, the second receptacle including an openable lid, the lid of the second receptacle being configured to fit in air tight engagement; and
   a valve configured to impede the egress of wastewater from the second receptacle, the lid of the second receptacle defining an aperture through which the valve extends when fitted.

2. A wastewater valve arrangement as claimed in claim 1, wherein the valve is configured to be normally open, and is configured to permit the release and ingress of air relative to the second receptacle.

3. A wastewater valve arrangement as claimed in claim 1, wherein the valve includes a float having a bottom recess.

4. A wastewater valve arrangement as claimed in claim 1, further including a filter for locating within the first receptacle, the filter including:
   an endless mesh wall;
   an inlet tube which extends from the mesh wall, the inlet tube having a lesser cross sectional area than a portion of the mesh wall; and
   a handle mounted to the mesh wall.

5. A wastewater valve arrangement as claimed in claim 1, wherein the lid of the first receptacle is configured to fit in air tight engagement so as to form the compression chamber, the lid being fitted to the first receptacle in air tight engagement using an O-ring.

6. A wastewater valve arrangement as claimed in claim 1, wherein the receptacles are interconnected by a pair of connection tubes which divergently extend from the first receptacle.

7. A wastewater valve arrangement as claimed in claim 1, wherein the first receptacle includes an outlet having a central longitudinal axis perpendicular to the central longitudinal axis of the first receptacle.

\* \* \* \* \*